US006749417B2

(12) United States Patent
Asakawa et al.

(10) Patent No.: US 6,749,417 B2
(45) Date of Patent: Jun. 15, 2004

(54) METHOD AND APPARATUS FOR PRODUCING CERAMIC GREEN SHEET

(75) Inventors: Shigenobu Asakawa, Fukui (JP); Yutaka Iseki, Takefu (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/338,708

(22) Filed: Jan. 9, 2003

(65) Prior Publication Data

US 2003/0102607 A1 Jun. 5, 2003

Related U.S. Application Data

(62) Division of application No. 09/783,909, filed on Feb. 15, 2001, now Pat. No. 6,605,241.

(30) Foreign Application Priority Data

Mar. 3, 2000 (JP) ....................................... 2000-059139

(51) Int. Cl.[7] ............................ B28B 13/02; B29D 7/00
(52) U.S. Cl. ......................... 425/224; 425/225; 425/226
(58) Field of Search ................................. 425/224, 225, 425/226

(56) References Cited

U.S. PATENT DOCUMENTS 4,482,514 A 11/1984 Schindler
5,670,187 A * 9/1997 Scalia et al. ................ 425/224

FOREIGN PATENT DOCUMENTS

JP 11-156825 6/1999
JP 11-254412 9/1999

OTHER PUBLICATIONS

Abstract of 411254412.

Machine Translation of JP 11–254412.

* cited by examiner

*Primary Examiner*—Christopher A. Fiorilla
(74) *Attorney, Agent, or Firm*—Keating & Bennett, LLP

(57) ABSTRACT

A method for producing ceramic green sheets allows the foreign substances on the surface of a carrier film to be reliably removed, prevents fluctuation of the path line when a carrier film is transferred by a foreign substance removal device, and enables a ceramic green sheet having a low local variation in thickness to be achieved. In this method for ceramic green sheets, a carrier film is transferred, the transfer direction of the carrier film is changed by a support roll, and the foreign substances on the carrier film surface are removed by an adhesive roll as a foreign substance removal device at the area where the carrier film is in contact with the peripheral surface of the support roll. Then ceramic slurry is applied on the carrier film using a ceramic slurry applying unit, and thereby a ceramic green sheet is formed.

11 Claims, 5 Drawing Sheets

METHOD AND APPARATUS FOR PRODUCING CERAMIC GREEN SHEET

This application is a Divisional of U.S. patent application Ser. No. 09/783,909 filed Feb. 15, 2001 now U.S. Pat. No. 6,605,241.

BACKGROUND OF THE INVENTION

1. Field of the Invention

The present invention relates to a method and an apparatus for producing ceramic green sheets, the method and apparatus being used for producing ceramic green sheets for use in laminated capacitors and other devices, and more particularly, to a method and an apparatus for producing ceramic green sheets each supported by carrier films.

2. Description of the Related Art

In recent years, in laminated ceramic electronic components such as laminated capacitors, the thickness of ceramic layers disposed between internal electrodes is becoming very small. This results in the reduced thickness of ceramic green sheets used. Therefore, typically, a ceramic green sheet is formed on a carrier film constituted of a synthetic resin film, and is treated while being supported by the carrier film.

When forming a ceramic green sheet by arriving ceramic slurry on a carrier film, the carrier film must be kept clean. Thus, various methods have been adopted in order to remove the foreign substances, such as dust or dirt, on the surface of the carrier film.

FIG. 7 is a schematic side view for explaining a first conventional method for removing the foreign substances on a carrier film. Herein, a carrier film 51 is transferring in the direction of the arrow A shown in the figure, that is, in the longitudinal direction of the carrier film 51. An adhesive roll 52 is in contact with one surface 51*a* of the carrier film 51 in the course of transfer, and the foreign substances on the one surface 51*a* of the carrier film 51 are removed by the adhesive force of the surface of the adhesive roll 52.

On the other hand, FIG. 8 is a side view for explaining a second conventional method for removing the foreign substances on a carrier film. Herein, a carrier film 53 is transferring in the direction of the arrow A shown in the figure. In order to remove the foreign substances on the one surface 53*a* of the carrier film 53, a suction nozzle 54 is disposed at a position adjacent to the surface 53*a*. The foreign substances on the one surface 53*a* of the carrier film 53 are sucked and removed by the suction force of the suction nozzle 54.

When using a foreign substance removal mechanism such as the adhesive roll 52 shown in FIG. 7 or the suction nozzle 54 shown in FIG. 8, the path line of the carrier film 51 or 53 in the course of transfer is not stabilized. This causes fluctuations of the transfer speed and tension, which results in local variations in the thickness of a ceramic green sheet.

That is, each of the carrier films 51 and 53 in the course of transfer is in an unstable state. Therefore, for example, in the method shown in FIG. 7, due to variations in the adhesive force of the adhesive roll 52, the carrier film 51 fluctuates in the direction of the arrow B shown in the figure, that is, in the thickness direction, and hence, the path line of the carrier film 51 is not stabilized. Consequently, when ceramic slurry is applied after the removal of foreign substances, variations in the amount of ceramic slurry applied occur, and the ceramic green sheet ultimately obtained is inevitably subjected to variations in the thickness thereof.

Likewise, in the method shown in FIG. 8, the path line of the carrier film 53 is not stable because of variations in the suction force of the suction nozzle 54, and the ceramic green sheet obtained also inevitably undergoes variations in the thickness.

In particular, when the thickness of the ceramic green sheet is reduced, the influences of fluctuations of the path line of the carrier films 51 and 53 become more significant, and thus, variations in the local thickness of the ceramic green sheets have constituted a more serious problem.

SUMMARY OF THE INVENTION

In order to overcome the problems described above, preferred embodiments of the present invention provide a method and an apparatus for producing ceramic green sheets, the method and apparatus preventing fluctuations of the path line due to a foreign substance removal device, without reducing the dust removing effect, and allowing ceramic green sheets having minimal variation in the thickness thereof to be thereby stably produced.

In accordance with a preferred embodiment of the present invention, there is provided a method for producing ceramic green sheets. The method preferably includes the steps of transferring a carrier film in the longitudinal direction thereof, removing foreign substances on the carrier film surface opposite to the carrier film surface in contact with a support roll, at the portion where the carrier film is in contact with the outer peripheral surface of the support roll, using a foreign substance removal device, while supporting the carrier film by the support roll so that the transfer direction of the carrier film is changed by the support roll, and forming a ceramic green sheet by providing ceramic slurry on at least one surface of the carrier film after the foreign substances have been removed.

Preferably, the portion where the foreign substances are removed by the foreign substance removal device is located approximately at the longitudinal center of the carrier film portion where the carrier film is in contact with the outer peripheral surface of the support roll.

In a particular aspect of the method in accordance with a preferred embodiment of the present invention, the ceramic slurry is applied on the carrier film surface from which the foreign substances have been removed.

In another particular aspect of the method in accordance with a preferred embodiment of the present invention, the ceramic slurry is applied on the carrier film surface opposite to the carrier film surface from which the foreign substances have been removed.

In accordance with another preferred embodiment of the present invention, there is provided an apparatus for producing ceramic green sheets. The apparatus includes a delivery roll for feeding a long carrier film, a transfer unit arranged to transfer the carrier film drawn out from the delivery roll in the longitudinal direction thereof, a support roll supporting the carrier film on the outer peripheral surface thereof so as to change the transfer direction of the carrier film, a foreign substance removal device disposed so as to remove the foreign substances on the carrier film surface opposite to the carrier film surface in contact with the support roll, at the portion where the carrier film is supported on the outer peripheral surface of the support roll, and a ceramic-slurry applying device for applying ceramic slurry on one carrier film surface from which the foreign substances have been removed, and for thereby forming a ceramic green sheet.

Preferably, the foreign substance removal device is disposed so as to remove the foreign substances on one carrier film surface approximately at the longitudinal center of the carrier film portion where the carrier film is contact with the support roll.

In a particular aspect of the apparatus in accordance with a preferred embodiment of the present invention, the foreign substance removal device is a contact-type foreign substance removal device for removing the foreign substances while being in contact with one surface of the carrier film.

In another particular aspect of the apparatus for producing ceramic green sheets in accordance with a preferred embodiment of the present invention, the foreign substance removal device is a noncontact-type foreign substance removal device for removing the foreign substances on one carrier film surface without contacting the carrier film supported by the support roll.

In still another particular aspect of the apparatus for producing ceramic green sheets in accordance with a preferred embodiment of the present invention, the support roll is a drive roll coupled with a rotational driving source, and the drive roll doubles as a least one portion of the transfer unit.

In a further particular aspect of the apparatus for producing ceramic green sheets in accordance with a preferred embodiment of the present invention, the ceramic-slurry applying device is disposed so as to apply the ceramic slurry on the carrier film surface from which the foreign substances have been removed.

In a yet further particular aspect of the apparatus for producing ceramic green sheets in accordance with a preferred embodiment of the present invention, the ceramic-slurry applying device is disposed so as to apply the ceramic slurry on the carrier film surface opposite to the carrier film surface from which the foreign substances have been removed.

The above and other aspects, features, elements, characteristics and advantages of the present invention will be clear from the following detailed description of the preferred embodiments of the invention in conjunction with the accompanying drawings.

DETAILED DESCRIPTION OF PREFERRED EMBODIMENTS

Figure 1:
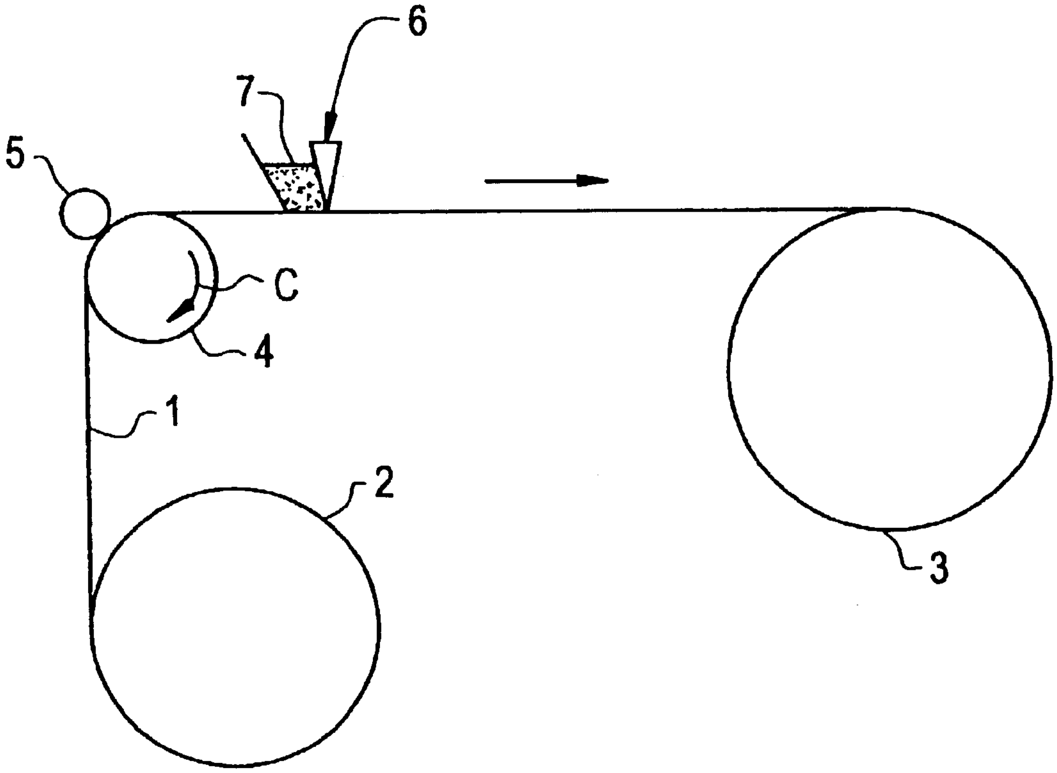
FIG. 1 is a schematic construction view for explaining a method and an apparatus for producing ceramic green sheets in accordance with a first preferred embodiment of the present invention.

FIG. 1 is a schematic construction view for explaining a method and an apparatus for producing ceramic green sheets in accordance with a preferred embodiment of the present invention.

This first preferred embodiment of an apparatus for producing ceramic green sheets preferably includes a delivery roll 2 around which a long carrier film 1 is wound. As a carrier film 1, an appropriate synthetic resin film having a low elongation property, such as a polyethylene phthalate film, is preferably used.

On the other hand, a take-up roll 3 is disposed at a distance from the delivery roll 2. The delivery roll 2 and the take-up roll 3 are coupled with a rotational driving source (not shown) such as a motor. The rotational driving source is arranged so as to transfer the carrier film 1 from the delivery roll 2 to the take-up roll 3 while controlling the tension of the carrier film so as to be constant. The transfer unit according to this preferred embodiment of the present invention preferably includes thus includes the delivery roll 2, the take-up roll 3, and the rotational driving source coupled with the delivery roll 2 and the take-up roll 3.

Between the delivery roll 2 and the take-up roll 3, a support roll 4 is provided. In this preferred embodiment, the support roll 4 is preferably constituted of a rotatable roll, and is arranged so as to be rotated in the direction of the arrow C shown in the figure, as the carrier film 1 is transferred while being in contact with the outer peripheral surface of the support roll 4. The support roll 4 is disposed so as to change the transfer direction of the carrier film 1. Specifically, in this preferred embodiment, once the carrier film 1 transferred from the delivery roll 2 passes the support roll 4, the transfer direction of the carrier film 1 is changed into the direction of approximately 90° with respect to the initial transfer direction. However, the extent of the change in the transfer direction of the carrier film 1 is not particularly limited. The extent of the change in the transfer direction may be more than about 90°, or may be less than about 90°.

The carrier film 1, therefore, is transferred toward the take-up roll 3 while being in contact with the outer peripheral surface of the support roll 4.

On the other hand, at the approximate longitudinal center of the carrier film 1 portion where the carrier film 1 is in contact with the outer peripheral surface of the support roll 4, an adhesive roll 5 is brought into contact with the carrier film 1 surface opposite to the carrier film 1 surface in contact with the outer peripheral surface of the support roll 4, and foreign substances such as dust or dirt on one surface of the carrier film 1 are removed by virtue of the adhesive force of the adhesive roll 5.

The adhesive roll 5 is arranged so that the outer peripheral surface thereof has adhesiveness, and is arranged so as to contact the support roll 4 with the carrier film 1 interposed therebetween.

In this preferred embodiment, a contact-type adhesive roll 5 is preferably used as a foreign substance removal device. At the portion where the adhesive roll 5 is in contact with the carrier film 1, the carrier film 1 surface opposite to the carrier film 1 surface in contact with the adhesive roll 5, is supported by the support roll 4. Hence, even if there are local variations in the adhesive force of the adhesive surface of the adhesive roll 5, fluctuations of the path line during transfer is prevented.

The carrier film 1 which has had the foreign substances removed by contacting the adhesive roll 5, is transferred toward the take-up roll 3. A ceramic-slurry applying device 6 is provided between the support roll 4 and the take-up roll 3.

In this preferred embodiment, the ceramic-slurry applying device 6 is provided in order to perform an application of ceramic slurry 7 preferably via a doctor blade method. As a slurry application method, however, an extrusion method such as the roll method or the die method may instead be used. Using the ceramic-slurry applying device 6, the ceramic slurry 7 is applied to produce a predetermined thickness, on the surface of the carrier film 1 which has been transferred, and from the surface of which foreign substances have been removed, and thereby a ceramic green sheet is formed. In such a manner, a ceramic green sheet is formed on the carrier film 1, and is taken up by the take-up roll 3.

In accordance with this preferred embodiment, since the portion where the adhesive roll 5 is in contact with the carrier film 1 in the course of transfer causes almost no fluctuation in the path line of the carrier film 1 as described above, the ceramic slurry can be applied with very high accuracy, on the carrier film surface from which foreign substances have been removed. This allows a ceramic green sheet having virtually no foreign substances and having minimal variations in the thickness to be easily achieved.

Figure 2:
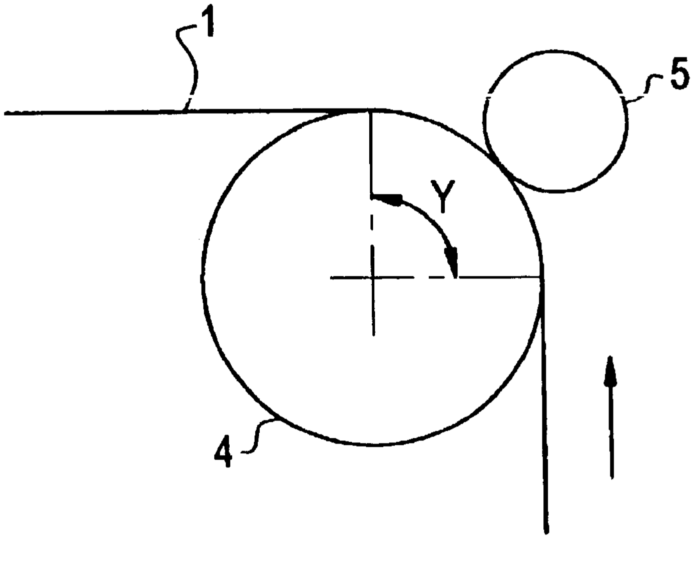
FIG. 2 is an partially enlarged side-view for explaining the positional relationship between the area where a support roll and a carrier film is in contact and an adhesive roll as a foreign-substance removal device, in the first preferred embodiment of the present invention.

Meanwhile, in this preferred embodiment, the portion where the above-described adhesive roll 5 contacts the carrier film 1, is preferably at the longitudinal center portion of the carrier film 1 area where the carrier film 1 is in contact with the outer peripheral surface of the support roll 4. This will be described in more detail with reference to FIG. 2. FIG. 2 is a schematic enlarged side-view illustrating the portion where the carrier film 1 passes between the support roll 4 and the adhesive roll 5. The carrier film 1 is transferred while being in contact with the outer peripheral surface of the support roll 4 so as to change the transfer direction thereof. In this case, the angle range within which the carrier film 1 is in contact with the outer peripheral surface of the support roll 4 is a wrapping angle Y, as shown in FIG. 2. In this first preferred embodiment, the adhesive roll 5 pressure-contacts the carrier film 1 approximately at the center of the arc with respect to the wrapping angle Y. This allows the fluctuation of the path line of the carrier film 1 to be effectively prevented.

As is evident from FIG. 2, the fluctuation of the path line hardly occurs so long as the adhesive roll 5 is in contact with the carrier film 1 within the above-mentioned wrapping angle Y.

The larger the wrapping angle is, the more surely the fluctuation of the path line of the carrier film 1 is prevented. It is therefore preferable that the wrapping angle is not less than about 90°.

Also, the larger the tension of the carrier film 1 during transfer, the less the carrier film is subjected to the influence of the pressure contact of the adhesive roll 5. Therefore, it is desirable to transfer the carrier film 1 with the tension thereof being increased.

Figure 3:
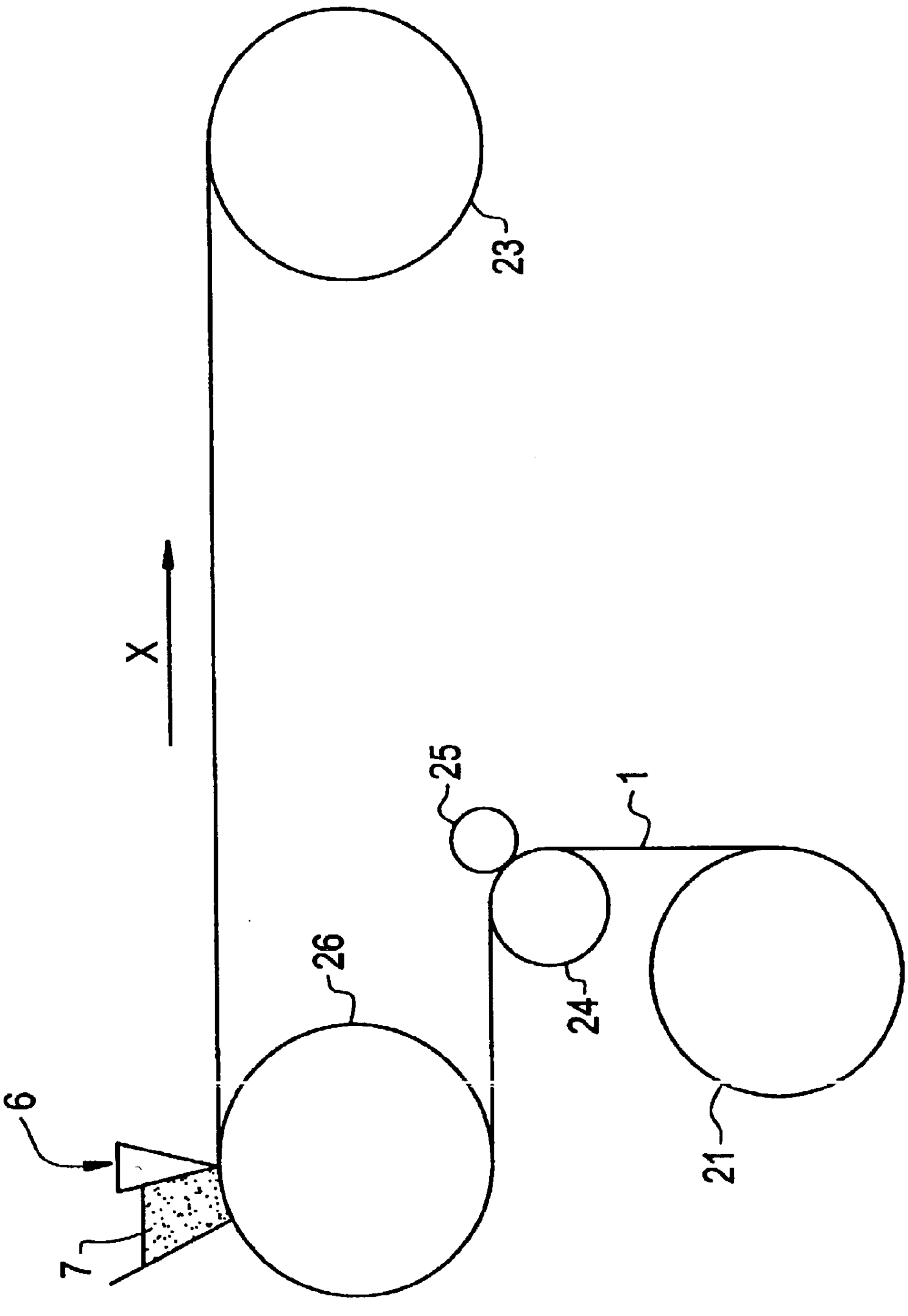
FIG. 3 is a schematic construction view for explaining a method and an apparatus for producing ceramic green sheets in accordance with a second preferred embodiment of the present invention.

FIG. 3 is a schematic construction view for explaining a method and an apparatus for producing ceramic green sheets in accordance with a second preferred embodiment of the present invention.

In the apparatus for producing ceramic green sheets in accordance with the second preferred embodiment of the present invention, the carrier film 1 is delivered from a delivery roll 21. The delivery roll 21 is preferably similar to the delivery roll 2 used in the first preferred embodiment. A take-up roll 23 is provided at a distance from the delivery roll 21. The take-up roll 23 is preferably similar to the take-up roll 3 in the first preferred embodiment, and constitutes an element of the transfer unit. The carrier film 1 is transferred in the direction of the arrow X shown in the figure.

Downstream from the delivery roll 21, a support roll 24 and an adhesive roll 25 are provided. The support roll 24 and the adhesive roll 25 are preferably similar to those in the first preferred embodiment of the present invention. The carrier film 1 is therefore transferred with the transfer direction thereof changed by the support roll 24, while being in contact with the outer peripheral surface of the support roll 24. The foreign substances on the carrier film 1 surface opposite to the carrier film 1 surface in contact with the support roll 24 are removed.

The second preferred embodiment is different from the first preferred embodiment in that a backing roll 26 is provided downstream from the support roll 24 and the adhesive roll 25. The backing roll 26 is arranged so that the carrier film surface from which foreign substances have been removed by the adhesive roll 25 contacts the outer peripheral surface of the backing roll 26. More specifically, in this preferred embodiment, the carrier film 1 is transferred while the carrier film surface from which foreign substances have been removed is in contact with the outer peripheral surface of the backing roll 26. Herein, the ceramic slurry 7 is applied, preferably via a ceramic-slurry applying device 6, on the portion where the carrier film 1 is in contact with the outer peripheral surface of the backing roll 26, and thereby a ceramic green sheet is formed on one surface of the carrier film 1.

As described above, in the second preferred embodiment, since the carrier film 1 is reversed by the backing roll 26, the ceramic slurry is applied on the carrier film surface opposite to the carrier film surface from which foreign substances have been removed, and thereby a ceramic green sheet is formed. Hence, foreign substances hardly exist between the outer peripheral surface of the backing roll 26 and the carrier film 1 surface that is in contact with the backing roll 26. This prevents local variations in the film thickness of the ceramic green sheet.

Figure 4A:
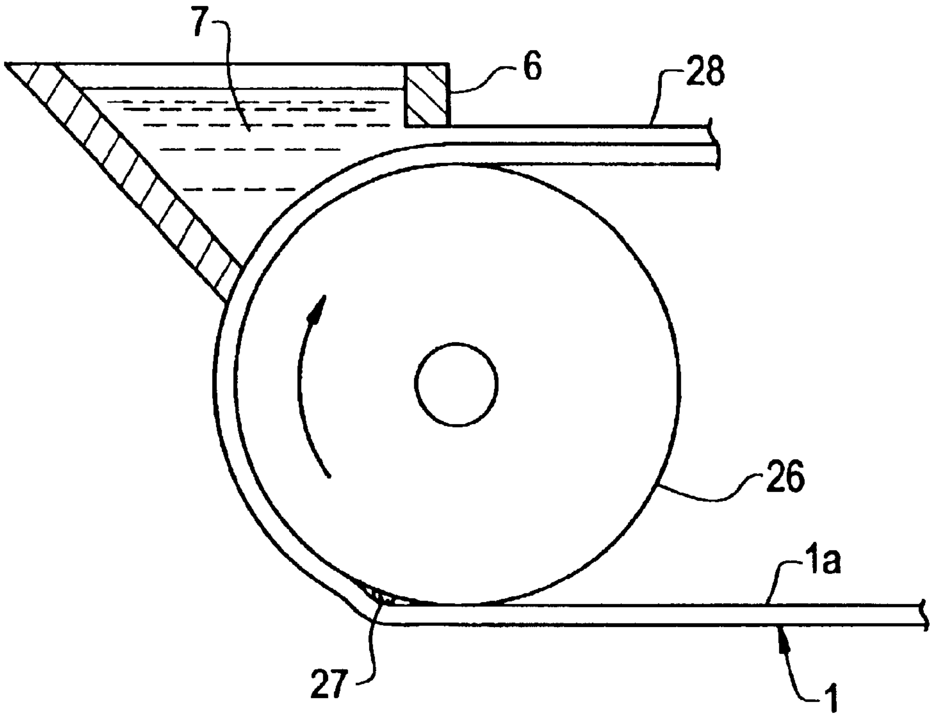
FIGS. 4A and 4B are each partially cutaway side-sectional-views for explaining that variations in the thickness occur among ceramic green sheets when foreign substances are adhered on the rear surface of the carrier film.
Figure 4B:
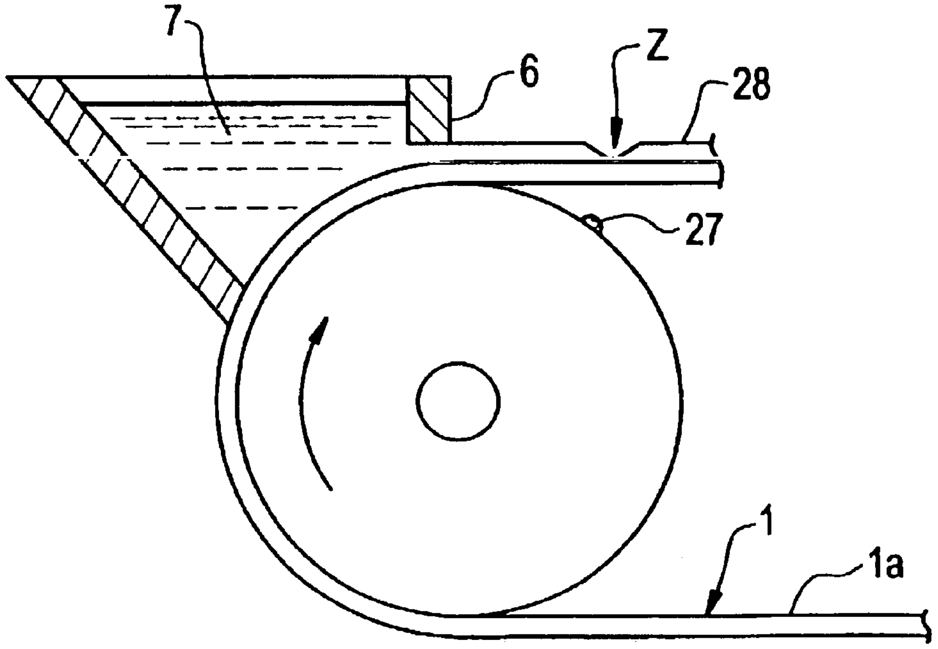

This will be described in more detail with reference to FIGS. 4A and 4B FIGS. 4A and 4B are partially cutaway sectional views for explaining the process in which the ceramic slurry 7 is applied by the ceramic-slurry applying device 6 using backing roll 26.

Suppose that, as shown in FIG. 4A, there is a foreign substance 27 on one surface 1*a* of the carrier film 1 against the backing roll 26. In this case, the carrier film 1 will bulge outwardly at the portion where the foreign substance 27 exists. As a result, as shown in FIG. 4B, when the ceramic slurry 7 is applied with a slurry-applying blade, the thickness of applied slurry is reduced at the portion where the foreign substance exists, so that a slurry-application defect indicated by the arrow Z in the figure occurs. That is, the ceramic green sheet 28 obtained has a slurry-application defective portion having a very thin film thickness.

In contrast to this, in the second preferred embodiment, since the surface of the carrier film 1 which is fed to the backing roll 26, and the surface of the carrier film 1 which is abutted against the outer peripheral surface of the backing roll 26, has previously been cleaned by the adhesive roll 25, a slurry-application defect as described above is prevented from occurring. In the second preferred embodiment also, therefore, a ceramic green sheet having a low local variation in thickness is produced.

In addition, in the second preferred embodiment, as in the case of the first preferred embodiment, since the adhesive roll 25 is in contact with the carrier film 1 at the area where the carrier film 1 is in contact with the support roll 24, fluctuations of the path line of the carrier film 1 due to the adhesive roll 25 are prevented. This also minimizes local variations in the slurry application.

Figure 5:
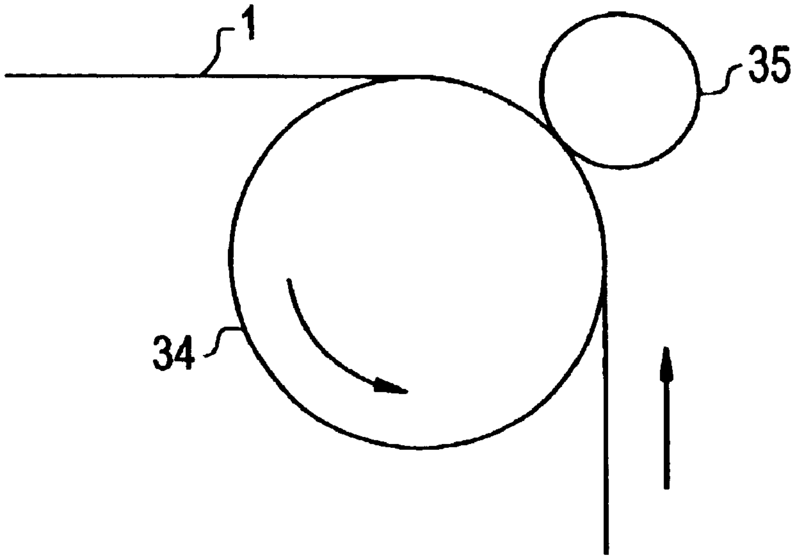
FIG. 5 is a schematic partially cutaway side-view for explaining the process in which the drive roll obtained by connecting the support roll to a rotational driving source and the adhesive roll as a foreign substance removal device for removing dirt and dust from the transfer carrier film.

In the first and second preferred embodiments, the support rolls 4 and 24 are each constituted of rotatable rolls, but the support roll may be used as a drive roll by coupling the support roll with a rotational driving source (not shown). FIG. 5 illustrates a modification in which the support roll constitutes a drive roll.

As illustrated in FIG. 5, a drive roll 34 is driven in the direction of the arrow shown in the figure, that is, in the direction where the carrier film 1 is transferred, by a rotational driving source (not shown). In this case, the drive roll 34 also constitutes an element of the transfer unit. However, in order to apply the ceramic slurry on the carrier film 1, and to take up the carrier film 1 with the take-up roll, at the later stages of the drive roll, it is desirable, as in the cases of the first or second preferred embodiment, to couple the take-up roll 3 or 23 with a rotational driving source (not shown) and to take up the carrier films 1. Even when using the drive roll 34 defining an element of the transfer unit, it is desirable to use take-up rolls 3 or 23 as the principle transfer means.

In the modification shown in FIG. 5, since the drive roll 34 is positively rotationally driven, the gripping force on the carrier film 1 is greatly improved by the drive roll. Further, since the carrier film 1 is pinched between the drive roll 34 and the adhesive roll 35, not only is the carrier film 1 stably transferred, but also accurate control of the transfer speed can be performed.

Figure 6:
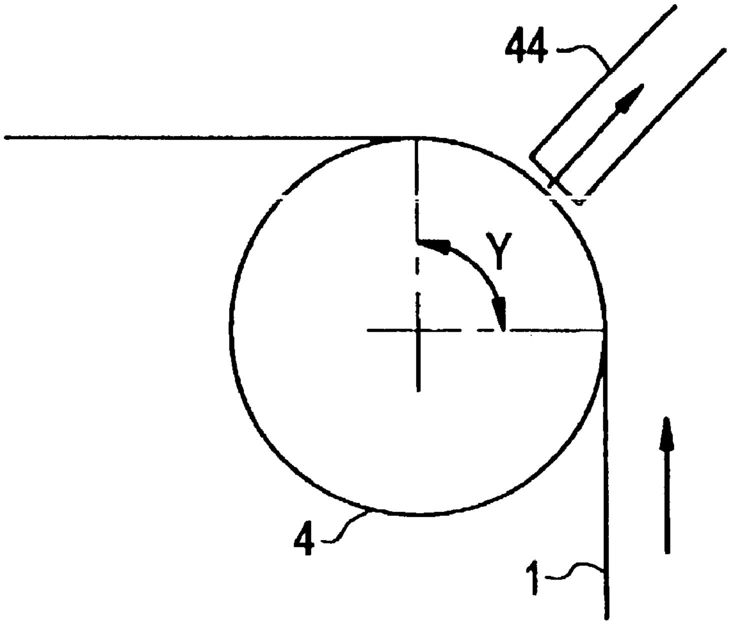
FIG. 6 is a partially cutaway side-view for explaining the positional relationship between the support roll and the suction nozzle when being used as a foreign substance removal device.
Figure 7:
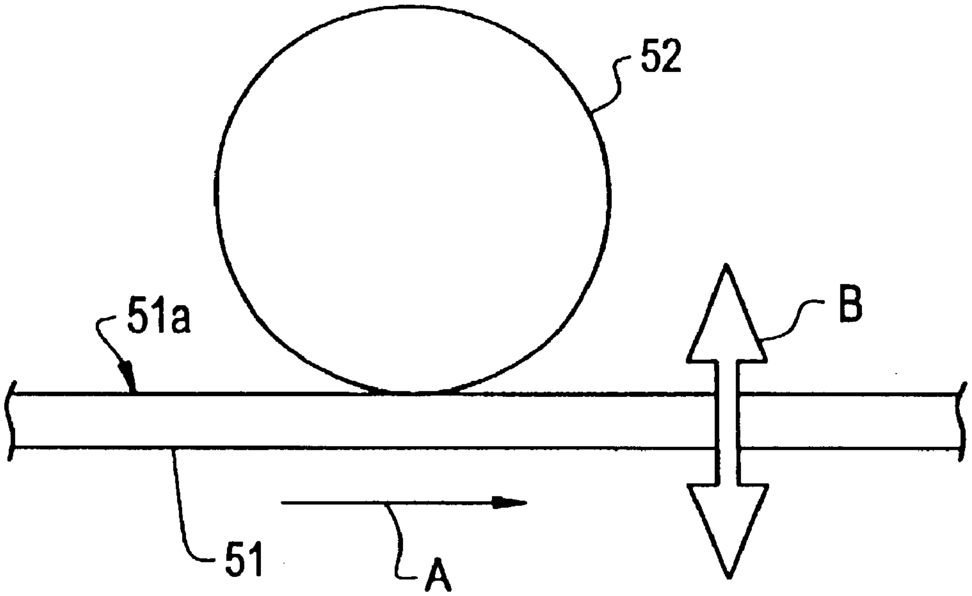
FIG. 7 PRIOR ART
FIG. 7 is a side view for explaining an example of a method for removing foreign substances in a conventional method for producing ceramic green sheets.
Figure 8:
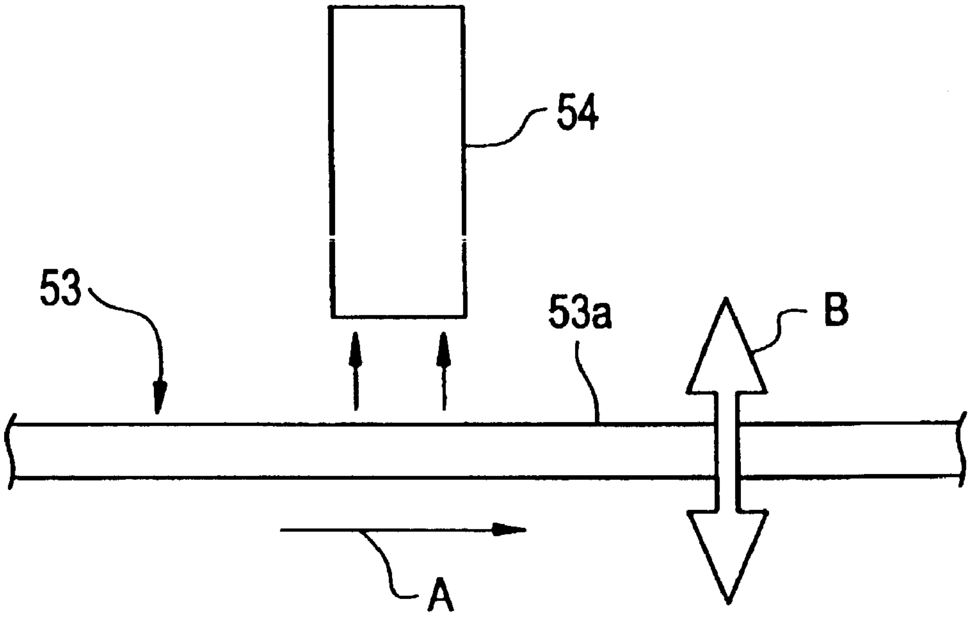
FIG. 8 PRIOR ART
FIG. 8 is a side view for explaining another example of a method for removing foreign substances in a conventional method for producing ceramic green sheets.

In the first and second preferred embodiments and the above-described modification, the adhesive roll is preferably used as a foreign substance removal device, but a wiping pad including cloth, paper, or other suitable element or material, or a foreign-substance wiping blade or the like may instead be used. Also, the foreign substance removal device is not limited to the contact-type foreign substance removal device which removes foreign substances by contacting the surface of the carrier film 1, but a non-contact type foreign substance removal device may instead be used, such as a device which blows foreign substances off by a suction nozzle or compressed gas. For example, as shown in FIG. 6, dust particles adhered to one surface of the carrier film 1 may be removed by sucking the dust particles at the carrier film 1 portion which is in contact with the outer peripheral surface of the support roll 4, using the suction nozzle 44. In this case also, as shown in FIG. 6, it is desirable to position the suction nozzle so as to remove foreign substances approximately at the longitudinal center of the carrier film portion which is in contact with the outer peripheral surface of the support roll, that is, approximately at the center of the arc with respect to the above-mentioned wrapping angle Y.

As described hereinbefore, in the method for producing ceramic green sheets in accordance with preferred embodiments of the present invention, prior to providing one surface of the carrier film with ceramic slurry, the foreign substances on the carrier film surface opposite to the carrier film surface in contact with the support roll are removed, at the portion where the carrier film is kept in contact with the support roll by the foreign substance removal device. This allows the surface of the carrier film to become free of foreign substances with reliability, which results in a ceramic green sheet having minimal local variation in thickness.

In addition, since the above-described foreign substance removal device is disposed so as to remove foreign substances from the carrier film surface at the area where the carrier film is in contact with the outer peripheral surface of the support roll, the fluctuation of the path line of the carrier film which is being transferred by the foreign removal device hardly occurs. This enables a ceramic green sheet having minimal local thickness variation to be stably produced.

In particular, when foreign substances are removed at the approximate longitudinal center portion of the carrier film at the area where the carrier film is in contact with the outer peripheral surface of the support roll, the path line of the carrier film can be prevented more reliably from the occurrence of fluctuations, and a ceramic green sheet having minimal local variations in the thickness can be achieved.

When the ceramic slurry is applied on the carrier film surface from which foreign substances are removed, a ceramic green sheet having minimal local thickness variations is achieved only by controlling the thickness of the applied slurry, since the ceramic slurry is applied on a clean surface of the carrier film.

Also, when the ceramic slurry is applied on the carrier film surface opposite to the carrier film surface from which foreign substances have been removed, the rear surface of the carrier film has no foreign substance adhered thereto, and hence, when, for example, the ceramic slurry is applied by supporting the carrier film using the backing roll, defects in applying ceramic slurry are prevented. This also allows a ceramic green sheet having minimal local thickness variations to be provided.

In the apparatus for producing ceramic green sheets in accordance with preferred embodiments of the present invention, since the delivery roll, the transfer unit, the support roll, and the foreign substance removal device are provided, the foreign substances on the carrier film surface opposite to the carrier film surface in contact with the support roll, are removed using the foreign substance removal device, at the portion where the carrier film is supported by the outer peripheral surface of the support roll, in accordance with the method of preferred embodiments of the present invention. In accordance with the method of preferred embodiments of the present invention, therefore, foreign substances can be reliably removed from the surface of the carrier film while preventing fluctuations of the path line of the carrier film, and hence it is possible to stably obtain a ceramic green sheet with minimal local thickness variations using the ceramic-slurry applying device.

In particular, when the foreign substance removal device is arranged so as to remove foreign substances approximately at the longitudinal center of the carrier film portion where the carrier film is contact with the outer peripheral surface of the support roll, fluctuations of the path line of the carrier film due to the foreign substance removal device are more reliably prevented, and a ceramic green sheet having greatly reduced and minimal local thickness variations can be achieved.

When a contact-type foreign substance removal device that contacts the carrier film is used as a foreign substance removal device, the foreign substances on the carrier film surface can be reliably removed. Also, when a noncontact-type foreign substance removal device is used as a foreign substance removal device, the foreign substances on the carrier film surface can be removed without affecting or impairing the carrier film surface.

When the support roll is the drive roll coupled with a rotational driving source, and thereby constitutes one portion of the transfer unit, the gripping force on the carrier film is greatly improved by the drive roll, and thereby the carrier film can be transferred with stability. Particularly when both of the drive roll and the contact-type foreign substance removal device are used, the carrier film is pinched between the drive roll and the contact-type foreign substance removal device, and hence it is also possible to control the transfer speed of the carrier film with a high accuracy.

While the invention has been described with respect to preferred embodiments thereof, obviously, numerous modifications and variations of the present invention are possible in light of the above teachings. It is therefore to be understood that within the scope of the appended claims, the invention may be practiced otherwise than as specifically described.

What is claimed is:

1. An apparatus for producing ceramic green sheets, said apparatus comprising:

a delivery roll arranged to feed a carrier film;

a transfer unit arranged to transfer the carrier film drawn out from said delivery roll in the longitudinal direction thereof;

a support roll arranged to support the carrier film on the outer peripheral surface thereof so as to change the transfer direction of said carrier film;

a foreign substance removal device including a cleaning roll, wherein the cleaning roll contacts the carrier film surface that is opposite to the carrier film surface that is in contact with the support roll, and the cleaning roll is arranged to contact the carrier film at a portion of the carrier film that is in contact with the outer peripheral surface of the support roll; and a ceramic-slurry applying device arranged to apply ceramic slurry on one carrier film surface from which the foreign substances have been removed by said foreign substance removal device, and to form a ceramic green sheet.

2. An apparatus for producing ceramic green sheets as claimed in claim 1, wherein said foreign substance removal device is disposed so as to remove the foreign substances on one surface of the carrier film approximately at the longitudinal center of the carrier film portion where the carrier film is contact with the outer peripheral surface of the support roll.

3. An apparatus for producing ceramic green sheets as claimed in claim 1, wherein said foreign substance removal device is arranged to contact a surface of the carrier film to remove the foreign substances from the carrier film.

4. An apparatus for producing ceramic green sheets as claimed in claim 1, wherein said foreign substance removal device is a noncontact-type foreign substance removal device that is arranged to remove the foreign substances on one surface of the carrier film without contacting the carrier firm supported by the support roll.

5. An apparatus for producing ceramic green sheets as claimed in claim 1, wherein said support roll includes a drive roll coupled with a rotational driving source and said drive roil functions as at least one portion of said transfer unit.

6. An apparatus for producing ceramic green sheets as claimed in claim 1, wherein said ceramic-slurry applying device is arranged to apply the ceramic slurry on the carrier film surface from which the foreign substances have been removed.

7. An apparatus for producing ceramic green sheets as claimed in claim 1, wherein said ceramic-slurry applying device is arranged to apply the ceramic slurry on the carrier film surface opposite to the carrier film surface from which the foreign substances have been removed.

8. An apparatus for producing ceramic green sheets as claimed in claim 1, wherein the support roll is arranged such that the transfer direction of the carrier film is changed by said support roll such that once the carrier film passes the support roll, the transfer direction of the carrier film is changed into the direction of approximately 90° with respect to the initial transfer direction.

9. An apparatus for producing ceramic green sheets as claimed in claim 1, further comprising a backing roll provided downstream from the support roll and a foreign substance removal device and arranged to contact the carrier film.

10. An apparatus for producing ceramic green sheets as claimed in claim 9, wherein the backing roll is arranged so that the carrier film surface from which foreign substances have been removed contacts the outer peripheral surface of the backing roll and the ceramic slurry is applied on the portion where the carrier film is in contact with the outer peripheral surface of the backing roll.

11. An apparatus for producing ceramic green sheets as claimed in claim 1, wherein the wrapping angle, defined by an angle range within which the carrier film is in contact with the outer peripheral surface of the support roll, in not less than about 90°.

* * * * *